United States Patent
Plondke et al.

(10) Patent No.: US 8,250,332 B2
(45) Date of Patent: Aug. 21, 2012

(54) PARTITIONED REPLACEMENT FOR CACHE MEMORY

(75) Inventors: Erich James Plondke, Austin, TX (US); Lucian Codrescu, Austin, TX (US); Ajay Ingle, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 609 days.

(21) Appl. No.: 12/482,529

(22) Filed: Jun. 11, 2009

(65) Prior Publication Data

US 2010/0318742 A1   Dec. 16, 2010

(51) Int. Cl.
*G06F 12/00* (2006.01)
(52) U.S. Cl. ......... 711/205; 711/153; 711/156; 713/324
(58) Field of Classification Search .............. 711/205, 711/153, 156; 713/324
See application file for complete search history.

(56) References Cited

U.S. PATENT DOCUMENTS

| | | | | |
|---|---|---|---|---|
| 5,696,932 A * | 12/1997 | Smith | ............ | 711/118 |
| 6,223,256 B1 | 4/2001 | Gaither | | |
| 6,629,208 B2 * | 9/2003 | Sturges et al. | ............ | 711/129 |
| 7,246,216 B2 * | 7/2007 | Swan | ............ | 711/173 |
| 7,558,919 B1 * | 7/2009 | Yochai et al. | ............ | 711/129 |
| 7,725,657 B2 * | 5/2010 | Hasenplaugh et al. | ........ | 711/130 |
| 7,797,555 B2 * | 9/2010 | Zmudzinski et al. | ......... | 713/300 |
| 2002/0087393 A1 * | 7/2002 | Philonenko | ............ | 705/11 |
| 2003/0115346 A1 * | 6/2003 | McHenry et al. | ............ | 709/229 |
| 2004/0172505 A1 | 9/2004 | Kurafuji | | |
| 2006/0259733 A1 * | 11/2006 | Yamazaki et al. | ............ | 711/173 |
| 2007/0143546 A1 * | 6/2007 | Narad | ............ | 711/130 |
| 2008/0229052 A1 * | 9/2008 | Ozer et al. | ............ | 711/202 |
| 2009/0049272 A1 | 2/2009 | Brunheroto et al. | | |

OTHER PUBLICATIONS

International Search Report and Written Opinion—PCT/US2010/038355, International Search Authority—European Patent Office—May 10, 2010, 11 pages.

* cited by examiner

*Primary Examiner* — Stephen Elmore
(74) *Attorney, Agent, or Firm* — Peter Michael Kamarchik; Nicholas J. Pauley; Jonathan T. Velasco (57) ABSTRACT

In a particular embodiment, a circuit device includes a translation look-aside buffer (TLB) configured to receive a virtual address and to translate the virtual address to a physical address of a cache having at least two partitions. The circuit device also includes a control logic circuit adapted to identify a partition replacement policy associated with the identified one of the at least two partitions based on a partition indicator. The control logic circuit controls replacement of data within the cache according to the identified partition replacement policy in response to a cache miss event.

27 Claims, 8 Drawing Sheets

| Table Look-Aside Buffer | | | |
|---|---|---|---|
| Virtual/Physical Address | Other Bits | Permissions | P-Bit |
| Address | | R | A |
| Address | | R,W,X | B |
| Address | | R,W,X | B |
| Address | | R,W | A |
| Address | | R,X | A |
| Address | | R,W,X | B |

PARTITIONED REPLACEMENT FOR CACHE MEMORY

I. FIELD

The present disclosure is generally related to a system and method of partitioned replacement for cache memory.

II. DESCRIPTION OF RELATED ART

In general, a cache memory can be utilized in computing systems to reduce memory access latencies. Such computing systems can include personal computers, wireless processing devices (such as wireless telephones, portable digital assistants (PDAs), and other wireless devices), gaming systems, other electronic devices, or any combination thereof. Generally, the cache memory is located between a processor and a main memory. Data and/or instructions that are accessed by the processor may be fetched from the main memory and stored in the cache memory to reduce latency.

From a processor perspective, an access to the cache memory is typically much faster than an access to the main memory. If the processor cannot locate a data item or instruction in the cache memory, a cache miss occurs and the main memory is accessed to retrieve the data item or instruction, which is loaded into the cache memory. If the cache is full, the data item or instruction may replace an existing item in the cache memory.

However, in a multi-threaded processor that includes a shared cache, each thread may have access to the cache memory and each thread may experience cache misses that result in a new data item being loaded into the cache memory. Such replacements can result in deletion of data or instructions from the cache that may be needed by another thread. Such replacements can adversely impact the performance of other threads.

III. SUMMARY

In a particular embodiment, a circuit device includes a translation look-aside buffer (TLB) configured to receive a virtual address and to translate the virtual address to a physical address of a cache having at least two partitions. The circuit device also includes a control logic circuit adapted to identify a partition replacement policy associated with the identified one of the at least two partitions based on a partition indicator. The control logic circuit controls replacement of data within the cache according to the identified partition replacement policy in response to a cache miss event.

In another particular embodiment, a method is disclosed that includes reading a translation look-aside buffer (TLB) entry to map a virtual address to a physical entry. The physical entry includes a partition indicator associated with a partition of a cache memory including at least two partitions. The method also includes selecting a cache replacement policy based on the partition indicator.

In still another particular embodiment, a method is disclosed that includes partitioning a cache memory into two or more partitions. A system configuration setting defines a size of each of the two or more partitions. The method also includes configuring a replacement policy associated with each of the two or more partitions.

One particular advantage provided by embodiments of the circuit device to determine a cache partition replacement policy is provided in that the circuit device can provide a guarantee of a quality of service (QoS) with respect to a high priority thread of a shared cache in a multi-threaded processor. For example, by controlling replacement of cache lines when a cache miss occurs, embodiments of a replacement control logic circuit disclosed herein may limit replacement to a particular partition within the cache. In this example, the replacement control logic circuit can reduce undesired replacement of data or instructions related to high priority threads by preventing replacement of data or instructions in a cache partition associated with the high priority thread.

Another particular advantage is provided in that the replacement policy for each partition of a partitioned cache may be different, allowing for higher Quality of Service operations to have a more tightly controlled replacement policy while other processes utilize a round robin, random, or other replacement strategy. This partition specific replacement policy allows for improved granularity for controlling cache performance in a multi-threaded processing system.

Other aspects, advantages, and features of the present disclosure will become apparent after review of the entire application, including the following sections: Brief Description of the Drawings, Detailed Description, and the Claims.

V. DETAILED DESCRIPTION

Figure 1:
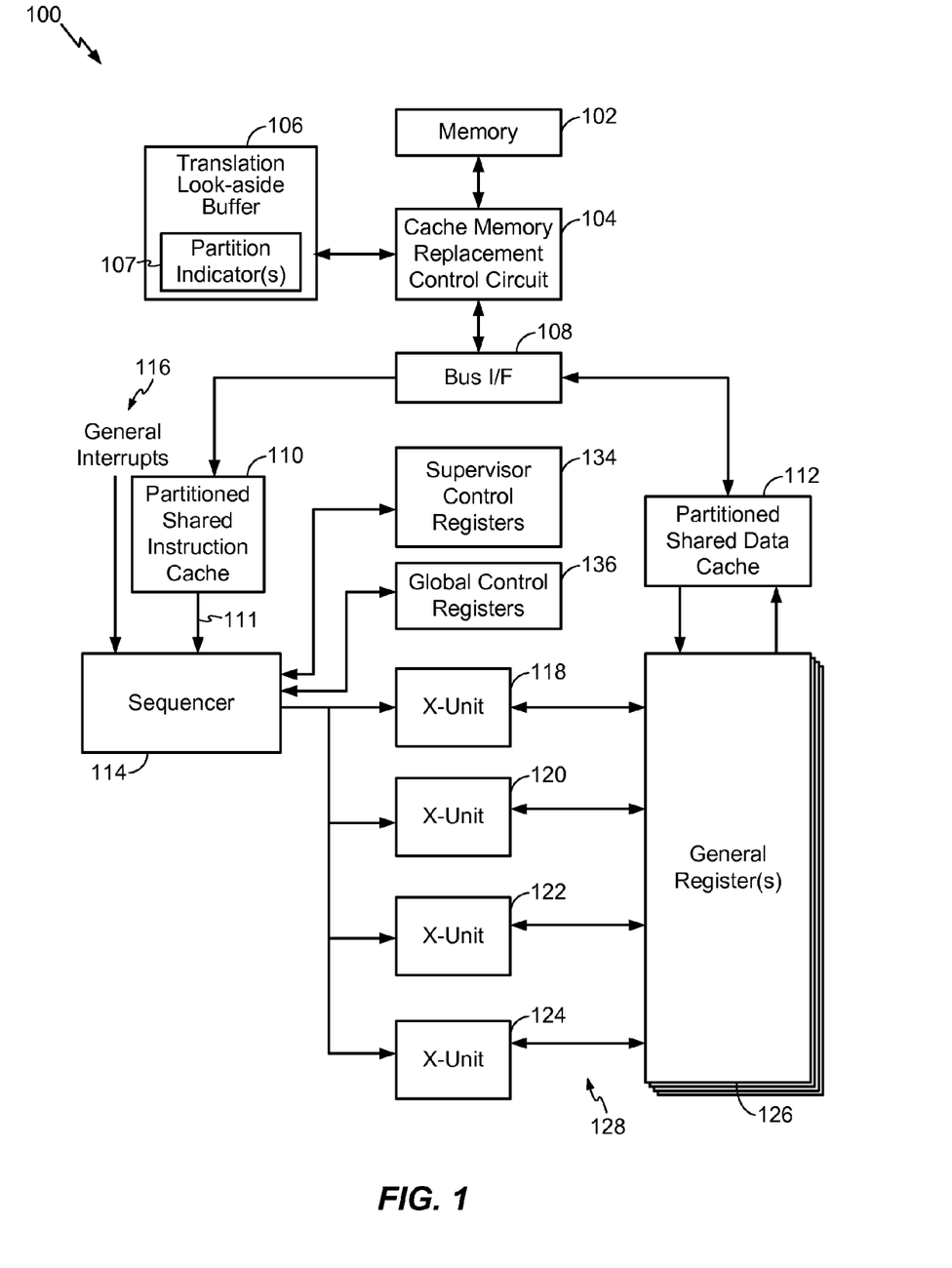
FIG. 1 is a block diagram of a particular illustrative embodiment of a processor including a cache memory replacement control circuit.

FIG. 1 is a block diagram of a particular illustrative embodiment of a processor 100 including a cache memory replacement control circuit 104 to manage cache replacement within a partitioned cache. In a particular example, the processor 100 may be a digital signal processor (DSP), a general-purpose processor, another type of processor, or any combination thereof. The processor 100 includes a memory 102 that is coupled to a partitioned shared instruction cache 110 and to a partitioned shared data cache 112 via a bus interface 108.

The cache memory replacement control circuit 104 is also coupled to the bus interface 108 and to a translation look-aside buffer (TLB) 106. The TLB 106 includes one or more table entries for translation of a virtual memory address to a physical memory address. Each table entry includes a partition identifier (i.e. partition bit or P-Bit) 107 identifying a partition of the partitioned shared instruction cache 110 or the partitioned shared data cache 112. The cache memory replacement control circuit 104 is adapted to provide a virtual address to the TLB 106 and to receive a physical address and a partition identifier from the TLB 106. The cache memory replacement control circuit 104 permits replacement of an entry in an identified partition, within one of the partitioned shared instruction cache 110 or the partitioned shared data cache 112, based on the partition indicator 107. In particular, when a cache miss occurs that results in an access to the main memory 102, the cache memory replacement control circuit 104 retrieves the partition indicator 107 from the TLB 106 and uses the partition indicator 107 to determine where a cache line replacement is permitted (i.e., in which partition the retrieved information may be written). In a particular embodiment, the cache memory replacement control circuit 104 may be integrated with the partitioned shared instruction cache 110, with the partitioned shared data cache 112, or any combination thereof.

The partitioned shared instruction cache 110 is coupled to a sequencer 114 via a bus 111. The sequencer 114 also receives general interrupts 116, which may be retrieved from an interrupt register (not shown). In a particular embodiment, the partitioned shared instruction cache 110 may be coupled to the sequencer 114 via a plurality of current instruction registers (not shown), which may be coupled to the bus 111 and associated with particular threads of the processor 100. In a particular embodiment, the processor 100 is an interleaved multi-threaded processor including six threads.

In a particular embodiment, the bus 111 is a one-hundred twenty-eight bit (128-bit) bus and the sequencer 114 is configured to retrieve instructions having a length of thirty-two (32) bits from the memory 102. The bus 111 is also coupled to a first instruction execution unit 118, a second instruction execution unit 120, a third instruction execution unit 122, and a fourth instruction execution unit 124. Each instruction execution unit 118, 120, 122, 124 is coupled to a general register file 126 via a bus, which is generally indicated at 128. The general register file 126 may also be coupled to the sequencer 114, the data cache 112, and the memory 102 via a second bus (not shown). The general register file 126 is coupled to the partitioned shared data cache 112 and is adapted to read data from and write data to the partitioned shared data cache 112.

The processor 100 may also include supervisor control registers 134 and global control registers 136 to store bits that may be accessed by control logic within the sequencer 114 to control execution of instructions. In a particular example, the supervisor control registers 134 and the global control registers 136 may include bits to configure partitions and partition sizes within the partitioned shared instruction cache 110 and the partitioned shared data cache 112. Additionally, the supervisor control registers 134 and the global control registers 136 may be accessible to the cache memory replacement control circuit 104. Particular bits within the supervisor control registers 134 and/or the global control registers 136 may specify a replacement control strategy to be used by the cache memory replacement control circuit 104 to replace particular lines within the partitioned shared instruction cache 110 and the partitioned shared data cache 112. In a particular example, the cache memory may be an n-way cache memory that is partitioned such that a first way of the n-way cache is associated with a first partition and a second way of the n-way cache is associated with a second partition. In a particular instance, the replacement control strategy may be partition specific, such that different replacement strategies can be used for replacement within different partitions. The replacement control strategies can be configured during an administrative operating mode. In a particular illustrative embodiment, particular applications may be able to configure the replacement control strategies during operation (i.e., on the fly) to enhance performance.

In a particular embodiment, the partitioned shared instruction cache 110 may be shared by the execution units 118, 120, 122, and 124 and may be partitioned into two or more partitions. For example, the partitioned shared instruction cache 110 may be partitioned into a first partition and a second partition, such as partitions 230 and 232 illustrated in FIG. 2 and partitions 306 and 308 illustrated in FIG. 3. In a particular example, higher priority threads may be assigned to the first partition, while lower priority threads or untrusted threads may be assigned to other partitions. On a cache miss related to a higher priority thread, such as a high priority processing thread, a new value is retrieved from the main memory 102, and the cache memory replacement control circuit 104 determines a cache partition bit and allocates the retrieved new value to a selected cache partition (e.g., the first partition 230) according to the cache partition bit. Additionally, the cache memory replacement control circuit 104 prevents other processes from replacing data or instructions in the selected partition. By selectively controlling replacement of cached instructions, quality of service may be enhanced for the high priority thread, since instructions for the high priority thread are not replaced by retrieved data related to a cache miss from another thread.

Similarly, data associated with a higher priority thread may be maintained in the shared partitioned data cache 112 that includes a first and second partition. By preventing lower priority threads from replacing the data in the first partition, the higher priority thread can trust that data in the first partition is not replaced based on a cache miss by a lower priority thread. Thus, quality of service for particular threads may be enhanced.

In a particular example, the cache memory replacement control circuit 104 may select a particular replacement algorithm based on the partition as determined from a partition indicator 107. For example, assuming the first partition is associated with a higher priority thread, the cache memory replacement control circuit 104 may select and utilize a "least frequently used"-type of replacement algorithm or a "round robin"-type of replacement algorithm for managing cache line replacements within the first partition. The cache memory replacement control circuit 104 may select a different replacement algorithm for the second partition. In a particular example, the cache memory replacement control circuit 104 can selectively apply one of a a round robin algorithm, a least frequently used replacement algorithm, a random replacement algorithm, or any combination thereof, for replacement of data or instructions in the second partition. In a particular instance, the cache memory replacement control circuit 104 may select a particular replacement algorithm based on a desired quality of service for a particular thread. The selected replacement algorithm may be used to determine which element of a memory to replace within a particular partition of the cache 110 or 112.

In a particular example, the cache memory replacement control circuit 104 may be included in a memory management unit (MMU) and the partition replacement control functions may be extended to other types of memory. In another example, a memory replacement control circuit, such as the cache memory replacement control circuit 104, may be adapted to control replacement access to a partition of a memory that has poor cacheability so that memory structures in a partition with poor cacheability do not evict information from structures with better cacheability in a different partition.

In another particular embodiment, the cache memory replacement control circuit 104 is adapted to monitor process usage and to dynamically adjust partition sizes and the partition replacement policies to provide a desired quality of service to particular threads. For example, certain tasks, such as higher priority tasks (e.g., real-time or near-real time executable instructions) may need a quality of service guarantee. Other types of code, such as Linux® operating system or application code JAVA®, and other code, may not be as well behaved and may try to consume a significant percentage of processor resources. The cache memory replacement control circuit 104 may dynamically adjust the size of a cache partition within one or both of the partitioned shared instruction cache 110 and the partitioned shared data cache 112. Such dynamic partitioning may be managed by adjusting page permissions within a global register or within the TLB 106, for example. By controlling replacement access to instructions within a particular partition of the cache, the higher priority task is guaranteed that expected data and instructions will not be overwritten by lower priority tasks, at least within the particular partition.

Figure 2:
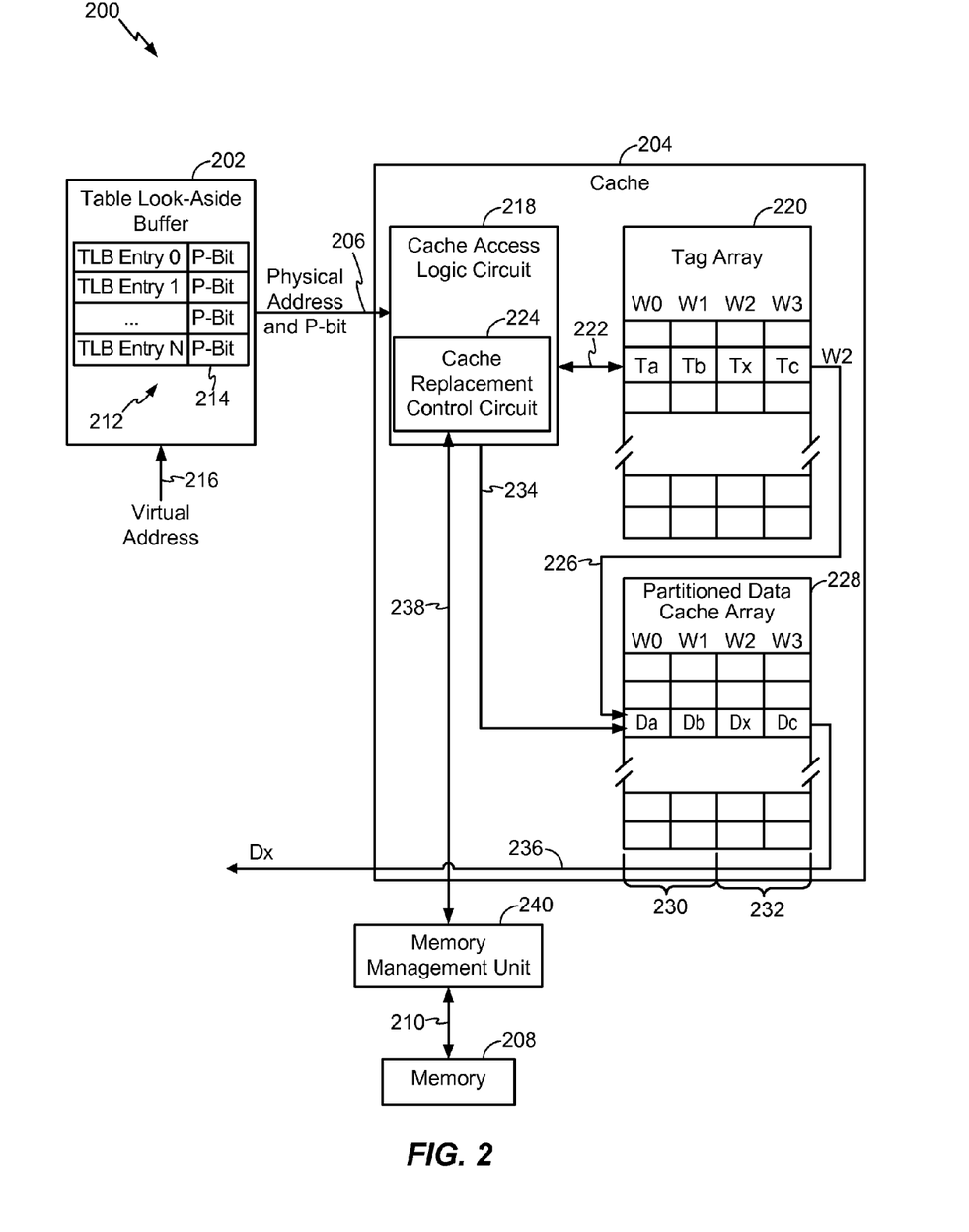
FIG. 2 is a block diagram of a second particular illustrative embodiment of a processor including a cache replacement control circuit.

FIG. 2 is a block diagram of a second particular illustrative embodiment of a processor 200 including a cache replacement control circuit 224. The processor 200 includes a translation look-aside buffer (TLB) 202 that communicates with a cache memory 204 via a bus 206. The cache memory 206 also communicates with a memory management unit 240, which communicates with a main memory 208 via a bus 210.

The TLB 202 includes a TLB entry table 212 that includes a list of TLB entries. The TLB entry table 212 also includes a partition indicator 214, such as a partition bit (P-Bit). The TLB entry table 212 may also include a physical address, a page size, a cacheability indicator, and permissions, such as read, write, execute, other permissions, or any combination thereof. In a particular embodiment, each entry in the TLB entry table 212 has an associated partition indicator 214. In another particular embodiment, some of the entries in the TLB entry table 212 may have an associated partition indicator 214 and other entries may be assigned a default partition indicator. The TLB 202 also includes an input 216 to receive a virtual address. The TLB 202 is adapted to receive the virtual address at the input 216 and to translate the virtual address to a physical address with a partition indicator that can be provided to the cache 204 via the bus 206.

In a particular embodiment, the cache memory 204 is a multi-way (N-Way) cache that includes a cache access logic circuit 218 that communicates with a tag array 220 via line 222. The cache access logic circuit 218 includes a cache replacement control circuit 224 that controls replacement of data within the cache 204 based on the partition indicator 214 received via the bus 206. The cache memory 204 also includes a partitioned cache data array 228, which communicates with the tag array 220 via line 226. In a particular embodiment, the cache memory 204 is a partitioned instruction cache array (such as the partitioned shared instruction cache 110 illustrated in FIG. 1), a partitioned data cache array (such as the partitioned shared data cache 112 illustrated in FIG. 1), or any combination thereof.

The cache access logic circuit 218 is responsive to physical address and partition indicator information received from the TLB 202. Each address from the TLB 202 includes a tag portion and an index portion, which may constitute a physical address, and a partition indicator 214 associated with that physical address. In a particular illustrative embodiment, the physical address may be a 32-bit address. In another particular embodiment, the partition indicator may include one or more bits to identify a partition within the cache memory 204.

In a particular embodiment, the cache access logic circuit 218 provides a control signal including an index value (Ix) and a tag value (Tx) to the tag array 220 via the line 222 to retrieve a plurality of tag values based on the input index value. Each of the tag values retrieved from the tag array 220 corresponds to a different one of a plurality of ways (such as way 0 (W0), way 1 (W1), way 2 (W2), and way 3 (W3)) within the multi-way cache data array 228. The cache access logic circuit 218 also provides an index value (Ix) to the partitioned cache data array 228 via line 234.

The input tag value (Tx) is compared to each of the plurality of tags from the tag array 220, based on the index value, to determine a matching tag and the associated identified way. In the particular illustrative example in FIG. 2, the tag value Tx corresponds to way W2, which is associated with a second partition 232 of the cache data array 228. In this example, the identified way W2 is provided via line 226 to the cache data array 228. In the event that the tag array 220, does not contain a tag matching the tag value (Tx) at any associated way within the tag array 220 corresponding to the index value (Ix), then a cache miss has occurred. The cache access logic circuit 218 can receive the cache miss data from the tag array 220 via line 222 and a request to retrieve the data or instruction is made via line 238 to the memory management unit 240, which can retrieve the data and/or instruction from the external memory 208.

If there is a cache hit, meaning that the way is identified within the tag array 220, the information is received at the cache access logic circuit 218, which provides the index information (Ix) to the partitioned data cache array and the identified way value is provided to an input of the partitioned cache data array 228.

The cache data array 228 is partitioned into a first partition 230 and a second partition 232. For example, as shown in FIG. 2, four different ways are shown (W0, W1, W2, and W3). In this example, the four ways (W0, W1, W2 and W3) are partitioned such that the ways W0 and W1 are associated with the first partition 230 and the ways W2 and W3 are associated with the second partition 232. When the cache data array 228 receives the index value and the way value via lines 234 and 226, identified data (Dx) can be retrieved from the second partition 232 and provided as an output via line 236.

If the desired data is not found in the partitioned cache data array 228 or the way identifier is not found in the tag array 220, then a cache miss has occurred. The cache access logic circuit 218 sends a memory access request to the memory management unit 240 to retrieve the data or the instruction from the external memory 208. The memory management unit 240 retrieves the data or the instruction from the memory 208 via a memory bus 210 and provides the information to the cache access logic circuit 218. The cache replacement control circuit 224 determines the partition indicator associated with the particular data or instruction to identify a partition within the cache data array 228 to which the data may be written. For example, if the cache miss occurred with respect to the second partition 232, the cache replacement control circuit 224 may identify the second partition 232 and write the data to the second partition. In particular, the cache replacement control circuit 224 determines whether to replace a line in the first partition 230 or the second partition 232 of the partitioned cache data array 228. Once the partition is identified (e.g., the second partition 232), the cache replacement control circuit 224 identifies a replacement control policy associated with the identified partition.

The replacement control policy defines a replacement strategy for electing which particular line is to be replaced with the retrieved data or instruction. The replacement control policy may be a round robin replacement strategy that replaces an address line that is next in a round robin order (i.e., a round robin strategy may cycle through cache address lines starting at address line 0, continuing line by line until address line N is reached, and then cycling back to line 0 to start over). Another replacement control policy may be a least frequently used replacement strategy that includes identifying a least frequently used line in the cache of all of the available lines, and replacing the identified line. Other replacement strategies may also be used, such as random replacement. Another strategy may include making a probabilistic estimate of which cache lines may not be needed, for example, based on a partial decode of the contents of the cache line and assumptions about the types of processes currently running.

Figure 5:
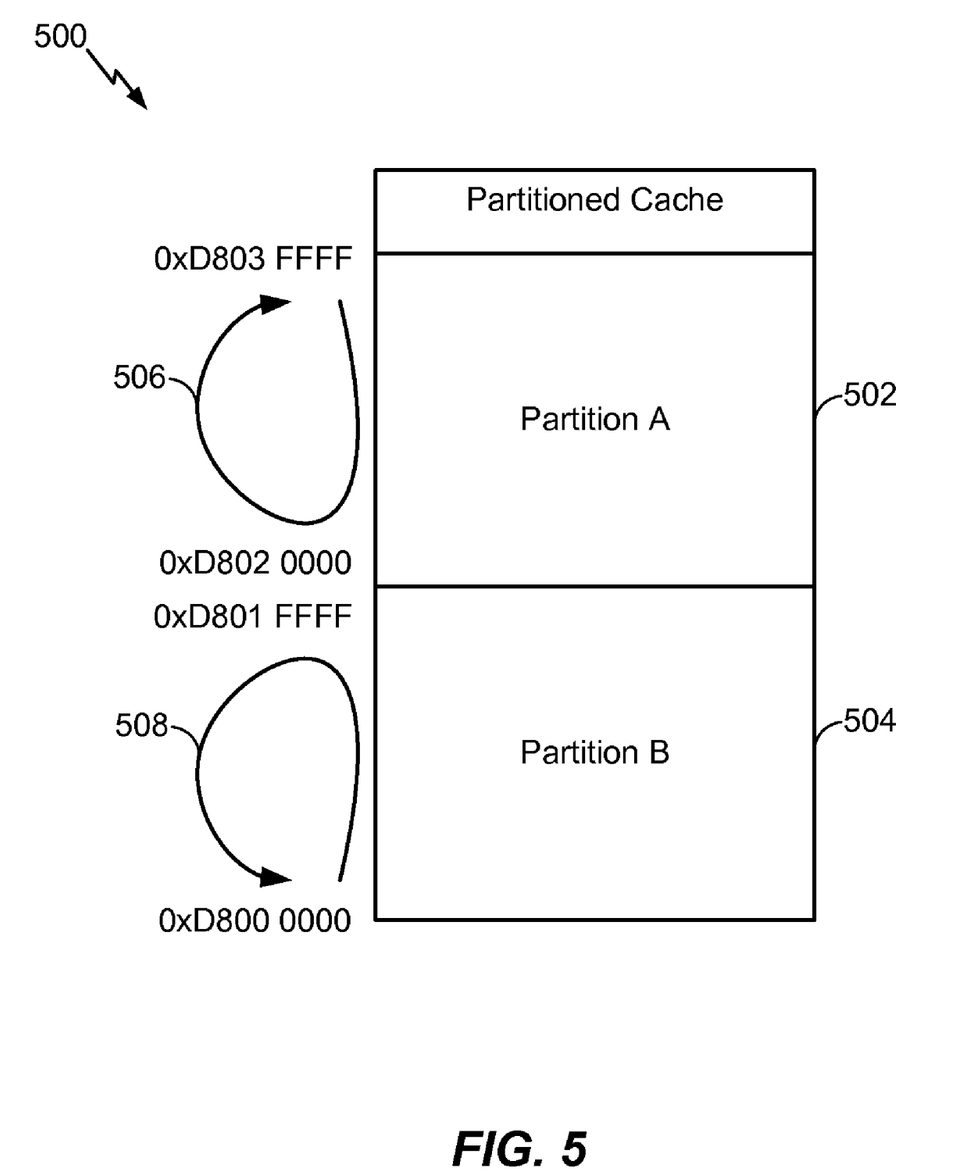
FIG. 5 is a block diagram of a particular illustrative embodiment of a partitioned cache memory illustrating different replacement strategies applied to each partition.

The cache replacement control circuit 224 may be adapted to apply a first replacement control strategy to the first cache partition 230 and a second replacement control strategy to the second cache partition 232. In a particular embodiment, the first cache partition 230 may be used to store instructions related to high priority processes or to a process that has a high quality of service requirement relative to other processes. The second cache partition 232 may be used to store instructions from other processes, which may have a lower priority or a lower quality of service. In this instance, the cache replacement control circuit may utilize a least frequently used replacement strategy to replace lines in the first cache partition 230, and use a random replacement strategy or round robin strategy with respect to replacement of lines in the second cache partition 232. In another embodiment, the cache replacement control circuit 224 may utilize a round robin replacement strategy for both the first and second cache partitions 230 and 232, but the replacement control circuit 224 may cycle through the first cache partition and the second cache partition differently. For example, if the partitioned cache includes a first partition that extends from cache line zero to cache line N and a second partition that extends from cache line O to cache line Z, the cache replacement control circuit 224 can replace data at the first cache partition 230 starting from line zero and proceeding to line N before cycling back and restarting at line zero. In contrast, the replacement control circuit 224 may cycle through the second cache partition from line Z to line O and then restart at line Z. An example of these two different round robin replacement strategies is illustrated in FIG. 5.

In a particular illustrative embodiment, the cache replacement control circuit 224 is configured to search the cache 204, including the tag array 220 and the partitioned cache data array 228, to identify an address match. The cache replacement control circuit 224 is adapted to identify a partition replacement policy associated with one of the partitions 230 and 232 based on the partition indicator (P-Bit) 214. The cache replacement control circuit 224 applies the identified partition replacement policy to control replacement of data within the identified partition (e.g., the first cache partition 230) according to the identified partition replacement policy.

In a particular example, the cache access logic circuit 218 is adapted to permit read or write access to the partitioned cache data array 228 (to both the first and second partitions 230 and 232). However, the cache replacement control circuit 224 prevents or limits replacement access to a particular partition (such as the first partition 230) based on the partition indicator 214. The partition indicator 214 identifies a particular partition (e.g., the first partition 230) within the partitioned data cache array 228. In a particular example, the cache access logic 218 is configured to reduce power consumption by disabling lookups to at least a portion of the partitioned data cache array (e.g., the second partition 232) that is not associated with the partition indicator (P-Bit 214), i.e., when the P-Bit 214 specifies the first partition 230. In a particular example, the cache access logic 218 may utilize the partition indicator to determine which of the partitions 230 and 232 is not used. In this instance, the cache access logic 218 can reduce power to the unused partition based on the partition indicator. In another particular example, the cache access logic 218 may include power control circuitry to selectively turn off power to a portion of a tag array 220, to a portion of a cache data array 228, or any combination thereof, within a cache memory 204.

Figure 3:
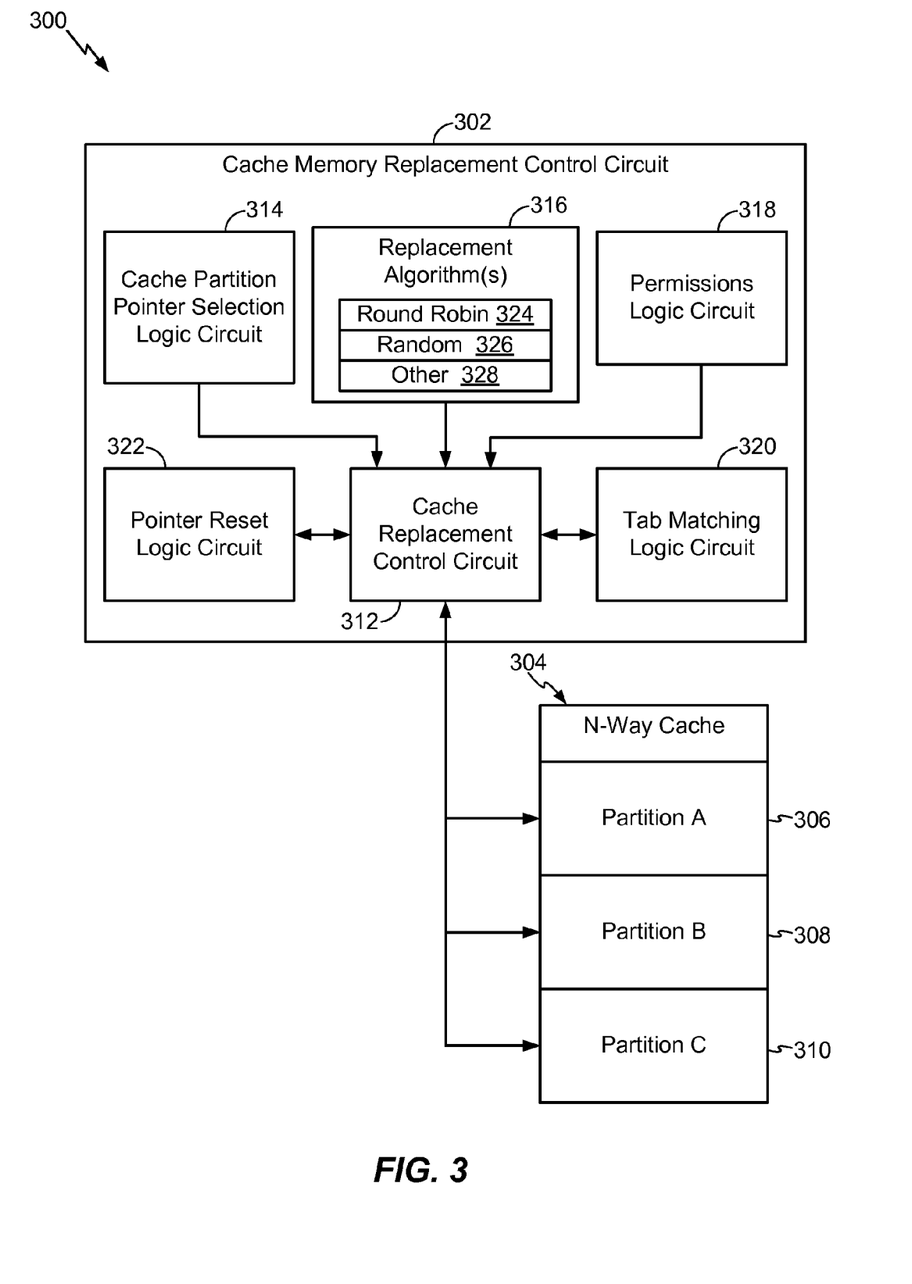
FIG. 3 is a block diagram of a particular illustrative embodiment of a circuit device including a cache replacement control circuit.

FIG. 3 is a block diagram of a particular illustrative embodiment of a circuit device 300 including a cache memory control circuit. The circuit device 300 includes a cache memory replacement control circuit 302 that communicates with an N-way cache 304, which is partitioned. The N-way cache 304 includes a first partition (Partition A) 306, a second partition (Partition B) 308, and a third partition (Partition C) 310. The cache memory replacement control circuit 302 includes a cache replacement control circuit 312, a cache partition pointer selection logic circuit 314, replacement algorithms 316, a permissions logic circuit 318, a tag matching logic circuit 320, and a pointer reset logic circuit 322.

The cache replacement control circuit 312 is adapted to communicate with the tag matching logic circuit 320 to receive data related to a tag that does not match data stored at a tag array, such as the tag array 220 illustrated in FIG. 2, indicating a cache miss. When data is retrieved based on a cache miss, the cache replacement control circuit 312 determines a partition indicator associated with the particular process that experienced the miss. Based on a partition indicator from a translation look-aside buffer (TLB), the cache replacement control circuit 312 determines a replacement algorithm 316. The replacement algorithms 316 may include a round robin algorithm 324, a random algorithm 326, and another algorithm 328 (such as a least frequently used algorithm, a first in first out algorithm, or other algorithms). In another particular embodiment, the replacement algorithms may include a round robin algorithm 324, a random algorithm 326, another algorithm 328, or any combination thereof The cache replacement control circuit 312 then utilizes the cache partition pointer selection logic circuit 314 to determine which cache line to replace within a partition identified by the partition indicator from the TLB.

In a particular example, the cache partition pointer selection logic 314 may be adapted to randomly determine a pointer for replacement of a cache line when the particular partition is associated with a random replacement algorithm 324. In another instance, the cache partition pointer selection logic circuit 314 may select a next cache line for replacement, when the replacement policy is a round robin replacement policy. In this instance, the pointer reset logic circuit 322 may monitor when each line of the partition has been cycled and then reset the pointer so that the cache partition pointer selection logic circuit 314 can restart at a first address line within the partition. The permissions logic circuit 318 may keep track of particular permissions associated with the data in the cache 304, so that the cache replacement control circuit 312 associates the permissions with the replaced cache line.

Figure 4:
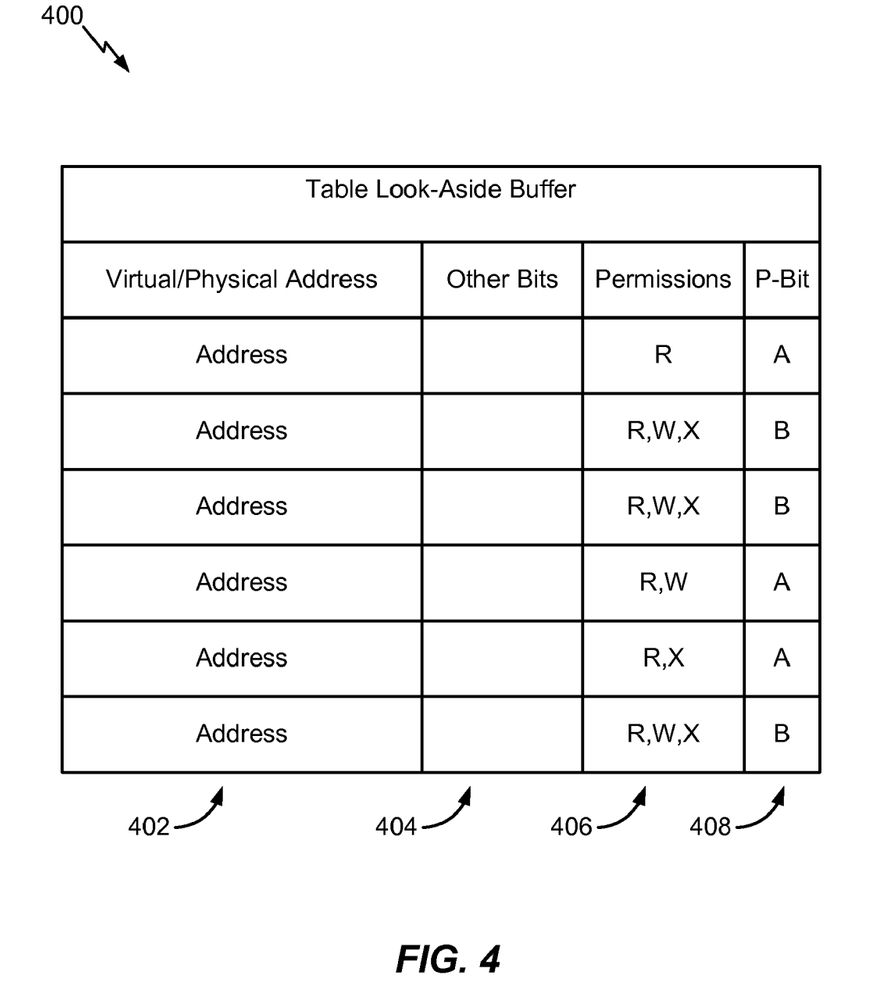
FIG. 4 is a block diagram of a particular illustrative embodiment of a translation look-aside buffer including a partition bit.

FIG. 4 is a block diagram of a particular illustrative embodiment of a translation look-aside buffer (TLB) 400 including virtual/physical address information 402, other bits 404 indicating a page size, a cacheability indicator, and other information, permissions 406 (i.e., read, write, execute, other permissions, or any combination thereof), and a partition indicator 408. The partition indicator 408 indicates a partition associated with a particular TLB entry, which can be utilized by cache replacement control circuitry, such as the cache replacement control circuit 312 illustrated in FIG. 3, to control replacement of the data in the particular cache line associated with the TLB entry.

FIG. 5 is a block diagram of a particular illustrative embodiment of a partitioned cache memory 500. The cache memory 500 includes a first partition (Partition A) 502 and a second partition (Partition B) 504. The first partition 502 may represent a cache memory area, for example, from address 0xD803 FFFF to 0xD802 0000. The second partition 504 may represent a cache memory area, for example, from address 0xD801 FFFF to 0xD800 0000. In a particular illustrative embodiment, cache replacement control circuitry, such as the cache replacement control circuit 312 illustrated in FIG. 3, is adapted to apply a round robin replacement strategy to replacement of data or instructions in both the first and second partitions 502 and 504. However, the cache replacement control circuitry may apply the round robin replacement strategy differently within each of the partitions, as indicated by the arrows 506 and 508. In particular, the cache replacement control circuitry cycles from a highest line to a lowest line within the first partition 502 and then returns to the highest line, as indicated at 506. The cache replacement control circuitry cycles from a lowest line to a highest line of the second partition 504 and then returns to the lowest line, as indicated at 508. Thus, the cache replacement control circuitry is adapted to apply different replacement strategies to each of the partitions.

In a particular example, the replacement strategy may be configurable using supervisor control registers, global control registers, or dedicated registers. In a particular example, the global registers may assign a replacement strategy to a particular partition. In another particular example, the global registers may be configured during execution of high priority processes (on the fly) by a particular process to define the replacement strategy for particular partitions.

Figure 6:
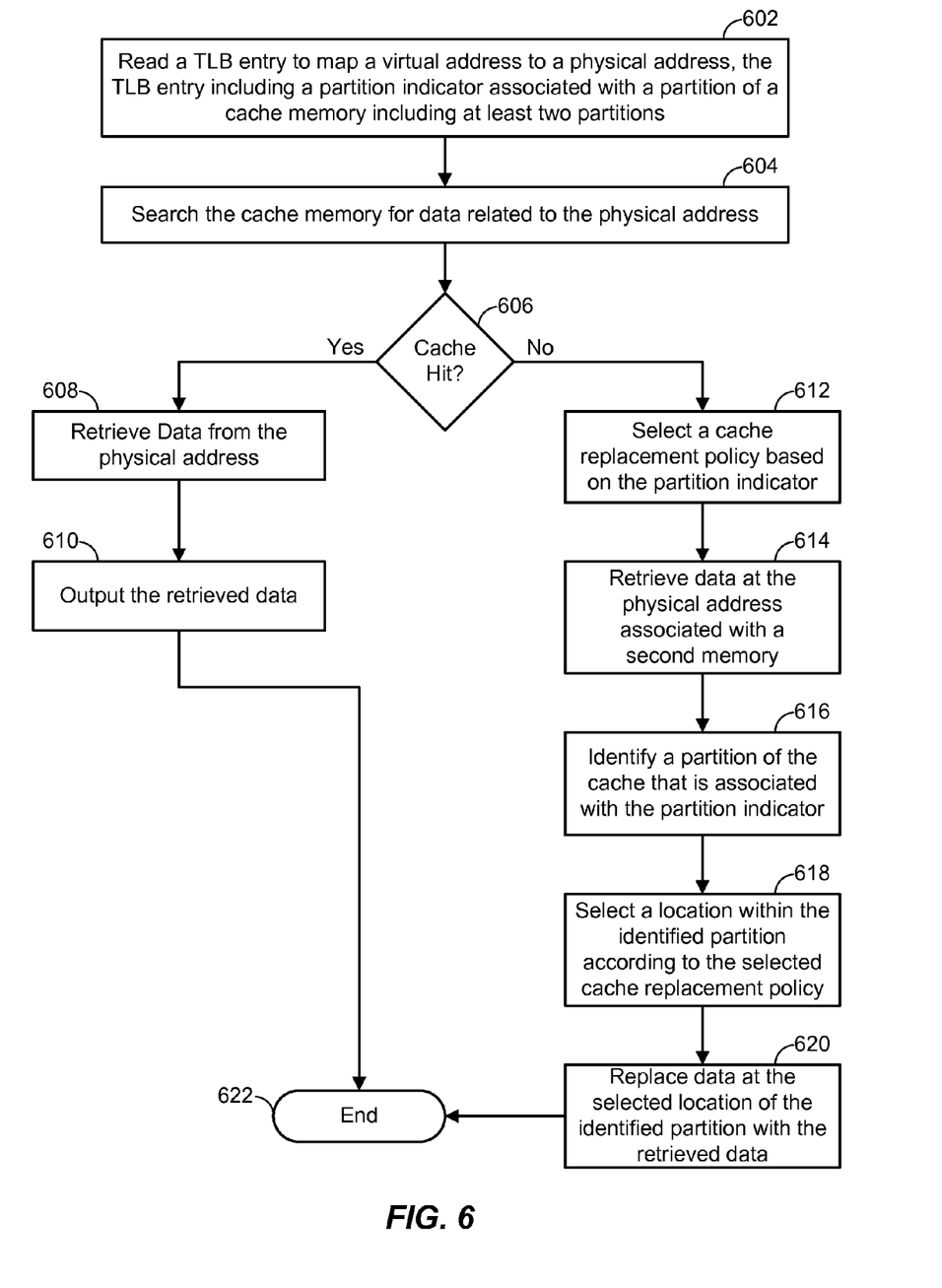
FIG. 6 is a flow diagram of a particular illustrative embodiment of a method of controlling replacement of items in a partitioned cache memory.

FIG. 6 is a flow diagram of a particular illustrative embodiment of a method of controlling replacement of items in a partitioned cache memory. The method includes reading a TLB entry to map a virtual address to a physical address and to retrieve a partition indicator associated with a partition of a cache memory that includes at least two partitions, at 602. Advancing to 604, the method includes searching the cache memory for data related to the physical address. At 606, if there is a cache hit, the method advances to 608 and data is retrieved from memory at the physical address. Continuing to 610, the method includes outputting the retrieved data. The method terminates at 622.

Returning to 606, if there is a cache miss, the method proceeds to 612 and a cache replacement policy is selected based on the partition indicator. The cache replacement policy may be selected based on a bit setting within a supervisor or global register. Alternatively, a logic circuit may select the policy based on a desired quality of service for a particular process. For example, high quality of service processes may use a more processor intensive replacement strategy, while lower priority processes may use a simpler strategy. In a particular example, a cache replacement control circuit may use different cache replacement policies for each of the partitions. For example, the cache replacement policy for the first partition may be a least frequently used replacement policy and the cache replacement policy for the second partition may be a round robin replacement strategy. Other replacement strategies may also be selected.

Continuing to 614, the method includes retrieving data at the physical address associated with a second memory (such as a main memory). Moving to 616, the method includes identifying a partition of the cache that is associated with the partition indicator. At 618, the method includes selecting a location within the identified partition according to the selected cache replacement policy. Continuing to 620, the method includes replacing the data at the selected location of the identified partition with the retrieved data. The method terminates at 622.

Figure 7:
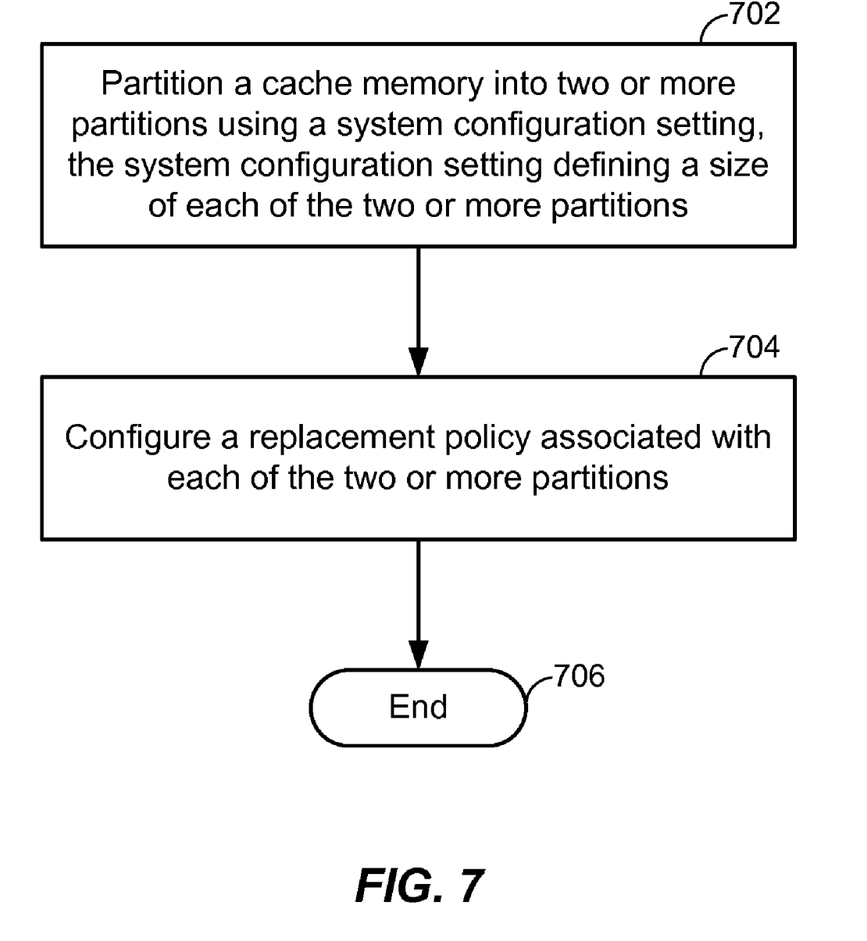
FIG. 7 is a flow diagram of a particular illustrative embodiment of a method of partitioning a cache memory.

FIG. 7 is a flow diagram of a particular illustrative embodiment of a method of partitioning a cache memory. At 702, the method includes partitioning a cache memory into two or more partitions using a system configuration setting. The system configuration setting defines a size of each of the two or more partitions. Continuing to 704, the method includes configuring a replacement policy associated with each of the two or more partitions. The replacement policy governs replacement access to the cache memory with respect to partitions of the cache memory. In a particular embodiment, the replacement policy can be set by writing replacement policy partition data into at least one of multiple entries in a translation look-aside buffer. The method terminates at 706.

In a particular illustrative embodiment, a first replacement policy is associated with a first partition and a second replacement policy is associated with a second partition of the two or more partitions. In another particular embodiment, a partition is selected and a replacement policy can be invoked on a per application basis. In another particular embodiment, a partition is selected for a particular process and the replacement policy is invoked on a per partition basis. In a particular embodiment, a software process or application may modify the replacement policy during operation. For example, the replacement policy may be modified in response to an application request, in response to an operating system command, or in response to usage information. In a particular example, the replacement policy may be dynamically modified in response to a priority level of a particular process or based on a quality of service indicator or requirement for a particular process. For example, a particular partition and/or a particular replacement policy may be associated with a particular process, based on a determination that such a process is a high priority process. Upon execution of the process, instructions and data associated with the process may be stored in a selected partition and processed using a selected replacement algorithm that corresponds to a desired quality of service.

Figure 8:
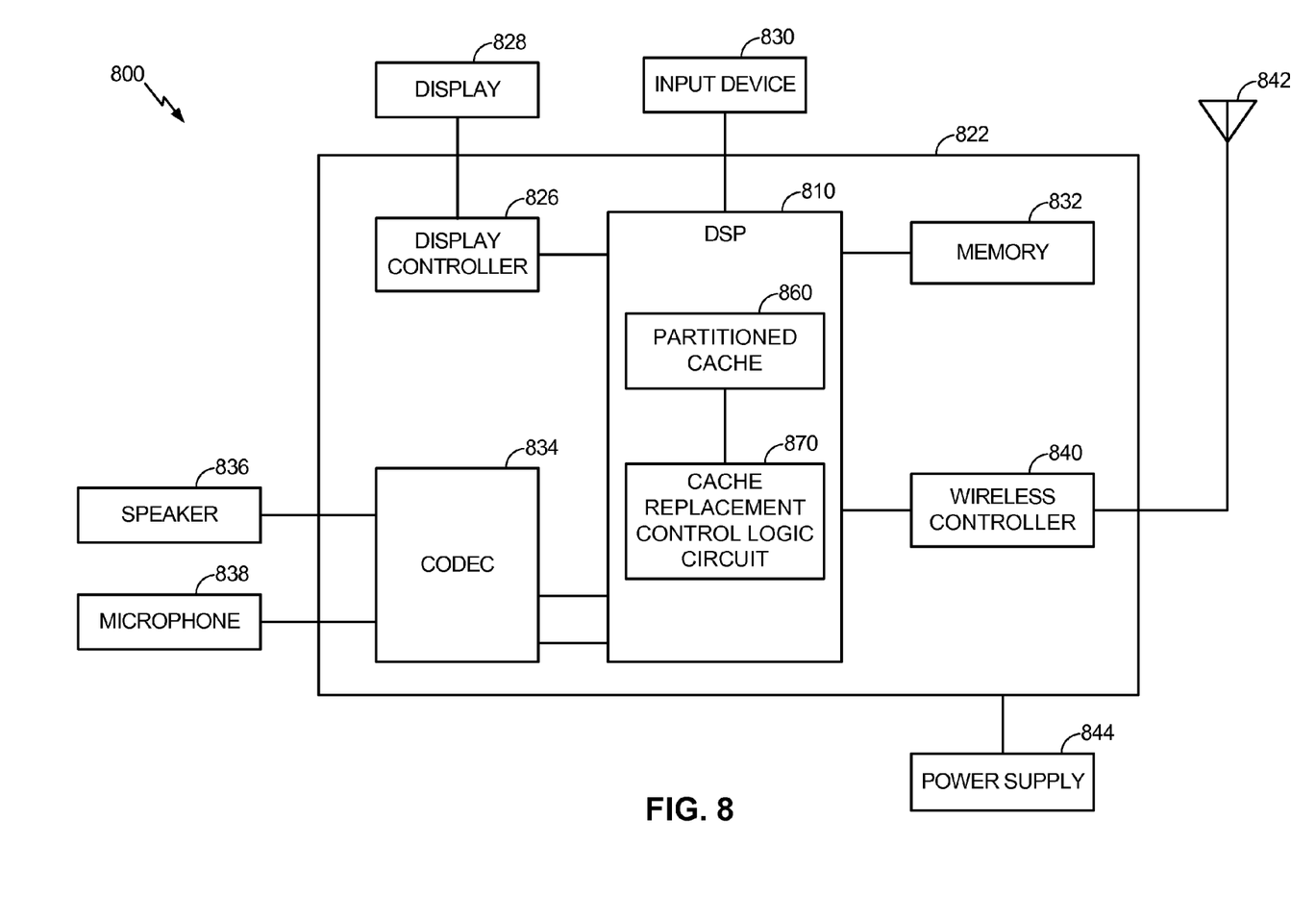
FIG. 8 is a block diagram of a communications device that includes a partitioned cache memory and a cache replacement control logic circuit.

FIG. 8 is a block diagram of a communications device that includes a partitioned cache memory and a cache replacement control logic circuit. The portable communications device 800 includes a partitioned cache 860, such as the partitioned instruction cache 110 and the partitioned data cache 112 illustrated in FIG. 1 and such as the cache memory 204 illustrated in FIG. 2. The portable communications device 800 also includes a cache replacement control logic circuit 870 that is coupled to the partitioned cache 860. The cache replacement control logic circuit 870 may operate similar to the cache control replacement circuitry 104, 224, and 312 of FIGS. 1-3, respectively. In a particular embodiment, a cache replacement control logic circuit 870 that is coupled to the partitioned cache 860 may include the cache 204, the cache access logic 218, the tag array 220 and the partitioned data cache 228 illustrated in FIG. 2. The cache replacement control logic circuit 870 may implement at least a portion of one or more of the methods depicted in FIGS. 6 and 7, such as by selectively controlling replacement of data and instructions within partitions of the partitioned cache 860.

The portable communications device 800 includes an on-chip system 822 that includes a processor, such as a digital signal processor 810. The digital signal processor 810 can include the partitioned cache 860 and the cache replacement control logic circuit 870, as described with respect to FIGS. 1-3. In a particular illustrative embodiment, the cache replacement control logic circuit 870 and the partitioned cache 860 may be used to control replacement of data within the partitions of the partitioned cache 860 to enhance quality of service to particular threads of a processor, such as the digital signal processor 810.

FIG. 8 also shows a display controller 826 that is coupled to the digital signal processor 810 and to a display 828. Moreover, an input device 830 is coupled to the digital signal processor 810. Additionally, a memory 832 is coupled to the digital signal processor 810. A coder/decoder (CODEC) 834 can also be coupled to the digital signal processor 810. A speaker 836 and a microphone 838 can be coupled to the CODEC 834.

FIG. 8 also indicates that a wireless controller 840 can be coupled to the digital signal processor 810 and to a wireless antenna 842. In a particular embodiment, a power supply 844 is coupled to the on-chip system 822. Moreover, in a particular embodiment, as illustrated in FIG. 8, the display 828, the input device 830, the speaker 836, the microphone 838, the wireless antenna 842, and the power supply 844 are external to the on-chip system 822. However, each is coupled to a component of the on-chip system 822.

It should be understood that while the cache replacement control logic circuit 870 and the partitioned cache 860 are depicted as separate components of the digital signal processor 810, the cache replacement control logic circuit 870 and the partitioned cache 860 may instead be integrated into a single cache unit, such as the cache 204 illustrated in FIG. 2. Similarly, it should be understood that multiple cache replacement control logic circuits 870 may be included. Additionally, while the replacement control circuitry has been described with respect to partitioned cache memories, it should be understood that the control strategy may be employed for other types of partitioned memories as well, thereby controlling replacement access to locations within the partitioned memory.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A circuit device comprising:
a translation look-aside buffer (TLB) configured to receive a virtual address and to translate the virtual address to a physical address of a cache having at least two partitions; and
a control logic circuit adapted to identify a partition replacement policy associated with an identified one of the at least two partitions based on a partition indicator and to control replacement of data or instructions within the cache according to the identified partition replacement policy in response to a cache miss event,
wherein the identified partition replacement policy reduces replacement by a first thread of data or instructions within the identified one of the at least two partitions, the identified one of the at least two partitions associated with a second thread having a higher priority than the first thread.

2. The circuit device of claim 1, wherein the TLB includes the partition indicator.

3. The circuit device of claim 1, wherein the control logic circuit is adapted to permit read or write access to the cache, and wherein the control logic circuit is configured to limit replacement access to one of the at least two partitions associated with the partition indicator.

4. The circuit device of claim 1, wherein the partition indicator identifies a particular partition within the cache, and wherein the control logic circuit is configured to turn off power to at least a portion of the cache that is not identified by the partition indicator.

5. The circuit device of claim 1, wherein the TLB comprises a plurality of entries and wherein each of the plurality of entries includes an associated partition indicator.

6. The circuit device of claim 5, wherein at least one of the plurality of entries includes a physical address, a page size, a cachability indicator, and permissions.

7. The circuit device of claim 1, wherein the control logic circuit is adapted to control replacement of data within a first partition of the at least two partitions according to a first replacement algorithm and to control replacement of data within a second partition according to a second replacement algorithm.

8. The circuit device of claim 7, wherein the first replacement algorithm comprises a first in first out algorithm and the second replacement algorithm comprises a random algorithm.

9. The circuit device of claim 1, wherein the cache comprises at least one of an instruction cache and a data cache.

10. The circuit device of claim 1, further comprising power control circuitry to selectively reduce power to a portion of a tag array, to a portion of a data cache, or any combination thereof, based on the partition indicator.

11. A method comprising:
reading, by a processing device, a translation look-aside buffer (TLB) entry to map a virtual address to a physical entry, the physical entry including a partition indicator associated with a first partition of a cache memory including at least two partitions; and
selecting a cache replacement policy based on the partition indicator,
wherein the selected cache replacement policy reduces replacement by a first thread of data or instructions within the first partition, the first partition associated with a second thread having a higher priority than the first thread.

12. The method of claim 11, further comprising replacing data within the first partition of the cache memory according to the selected cache replacement policy in response to a cache miss event.

13. The method of claim 11, wherein the first partition of the at least two partitions is associated with a first cache replacement policy and a second partition of the at least two partitions is associated with a second cache replacement policy.

14. The method of claim 13, wherein the first cache replacement policy includes a cache replacement algorithm.

15. A method comprising:
partitioning, by a processing device, a cache memory into two or more partitions, wherein a system configuration setting defines a size of each of the two or more partitions; and
configuring a first replacement policy associated with a first partition of the two or more partitions,
wherein the first replacement policy is dynamically modified in response to a priority of an application.

16. The method of claim 15, wherein configuring the first replacement policy includes writing replacement policy partition data into at least one entry in a translation look-aside buffer.

17. The method of claim 15, wherein a second replacement policy is associated with a second partition of the two or more partitions.

18. The method of claim 17, wherein the first replacement policy governs replacement access to the first partition.

19. The method of claim 18, wherein the first replacement policy is invoked on a per application basis.

20. The method of claim 15, wherein the first replacement policy is modifiable in response to an application request.

21. The method of claim 15, wherein the first replacement policy is modifiable in response to an operating system command.

22. The method of claim 15, wherein the first replacement policy is dynamically modified in response to application usage.

23. The method of claim 11, wherein the selected cache replacement policy is dynamically modified in response to a priority of an application.

24. The method of claim 15, wherein the first replacement policy reduces replacement of data or instructions by low priority threads within the first partition, and wherein the first partition is related to high priority threads of the processing device.

25. The method of claim 24, wherein the processing device comprises an interleaved multi-threaded processor including six threads, and wherein the cache memory is shared by at least two of the six threads.

26. An apparatus comprising:
means for receiving a virtual address and translating the virtual address to a physical address of a cache having at least two partitions; and
means for identifying a partition replacement policy associated with an identified one of the at least two partitions based on a partition indicator and controlling replacement of data or instructions within the cache according to the identified partition replacement policy in response to a cache miss event,
wherein the identified partition replacement policy reduces replacement by a first thread of data or instructions within the identified one of the at least two partitions, the identified one of the at least two partitions associated with a second thread having a higher priority than the first thread.

27. A non-transitory computer-readable storage medium comprising instructions that, when executed by a processor, cause the processor to:
partition a cache memory into two or more partitions, wherein a system configuration setting defines a size of each of the two or more partitions; and
configure a first replacement policy associated with a first partition of the two or more partitions,
wherein the first replacement policy is dynamically modified in response to a priority of an application.

* * * * *